US009507710B2

(12) United States Patent
Conklin et al.

(10) Patent No.: US 9,507,710 B2
(45) Date of Patent: *Nov. 29, 2016

(54) COMMAND EXECUTION USING EXISTING ADDRESS INFORMATION (71) Applicant: Seagate Technology LLC, Cupertino, CA (US)

(72) Inventors: Kris Conklin, Burnsville, MN (US); Bruce Dunlop, Bloomington, MN (US); Mark Allen Gaertner, Vadnais Heights, MN (US); Ryan James Goss, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,522

(22) Filed: May 4, 2015

(65) Prior Publication Data

US 2015/0234741 A1  Aug. 20, 2015

Related U.S. Application Data (63) Continuation of application No. 14/034,211, filed on Sep. 23, 2013, now Pat. No. 9,026,699.

(51) Int. Cl.
 *G06F 13/12* (2006.01)
 *G06F 12/02* (2006.01)

(52) U.S. Cl.
 CPC ... *G06F 12/0246* (2013.01); *G06F 2212/1016* (2013.01); *G06F 2212/7203* (2013.01)

(58) Field of Classification Search
 CPC .................. G06F 12/0246; G06F 2212/1016; G06F 2212/7203
 See application file for complete search history.

(56) References Cited

U.S. PATENT DOCUMENTS

| | | | | |
|---|---|---|---|---|
| 5,574,887 | A | * | 11/1996 | Fitch ...................... G06F 9/3017 703/13 |
| 8,280,041 | B2 | | 10/2012 | Douguet et al. |
| 8,397,024 | B2 | | 3/2013 | Fasoli et al. |
| 2006/0026598 | A1 | | 2/2006 | Handlogten et al. |
| 2007/0101096 | A1 | | 5/2007 | Gorobets |
| 2013/0332681 | A1 | * | 12/2013 | Miller ................... G06F 3/0659 711/154 |
| 2014/0281147 | A1 | * | 9/2014 | Yoshimura .......... G06F 12/0246 711/103 |

* cited by examiner

*Primary Examiner* — Jing-Yih Shyu
(74) *Attorney, Agent, or Firm* — Hall Estill Attorneys at Law (57) ABSTRACT Method and apparatus for managing data in a memory, such as a flash memory. In accordance with some embodiments, a memory module has a plurality of solid-state non-volatile memory cells. A controller communicates a first command having address information and a first operation code. The first operation code identifies a first action to be taken by the memory module in relation to the address information. The controller subsequently communicates a second command having a second operation code without corresponding address information. The memory module takes a second action identified by the second command using the address information from the first command.

20 Claims, 5 Drawing Sheets

COMMAND EXECUTION USING EXISTING ADDRESS INFORMATION

RELATED APPLICATION

This application is a continuation of U.S. patent application Ser. No. 14/034,211 filed on Sep. 23, 2013, which issues as U.S. Pat. No. 9,026,699 on May 5, 2015.

SUMMARY

Various embodiments of the present disclosure are generally directed to the management of data in a memory, such as but not limited to a flash memory.

In accordance with some embodiments, a memory module has a plurality of solid-state non-volatile memory cells. A controller communicates a first command having address information and a first operation code. The first operation code identifies a first action to be taken by the memory module in relation to the address information. The controller subsequently communicates a second command having a second operation code without corresponding address information. The memory module takes a second action identified by the second command using the address information from the first command.

These and other features which may characterize various embodiments can be understood in view of the following detailed discussion and the accompanying drawings.

DETAILED DESCRIPTION

The present disclosure generally relates to managing data stored in a memory module, such as but not limited to a flash memory of a data storage device.

A wide variety of data storage memories are known in the art. Some memories are formed from solid-state memory cells which store data in relation to an amount of accumulated charge on a floating gate structure, such as with flash memory. An erasure operation is generally required before new data can be written to a given flash memory location.

Some flash memory devices include a flash memory module and a controller. A pull system is used whereby the controller issues commands to the memory module and then checks to determine if the requested command has been completed. This tends to increase the number of times that commands need to be issued to the memory module, such as in the case where a status is repetitively checked after the issuance of a command. Multiple commands may further be issued to execute concurrent operations on corresponding locations (such as different planes) within the memory module that share a common column and/or row address.

Various embodiments of the present disclosure are accordingly directed to an apparatus and method for managing data in a memory, such as but not necessarily limited to a flash memory. As explained below, a storage device is provided with a controller and a memory module. The controller is adapted to communicate address information in conjunction with a first operation code identifying an action to be taken by the memory module in relation to the address information. The controller is further adapted to subsequently communicate a second operation code to the memory module without corresponding address information. The memory module takes an action corresponding to the second operation code associated with the address information provided with the first operation code.

A variety of command types can be used, such as read commands, write (program) commands, status request commands, data out commands, multi-plane program commands, multi-plane read commands, multi-plane erase commands, global inherit commands, local inherit commands, etc. Both row and column addressing forms can be used.

In this way, the amount of I/O transfer volume between the controller and the memory module can be reduced, and greater processing and throughput efficiencies can be achieved.

Figure 1:
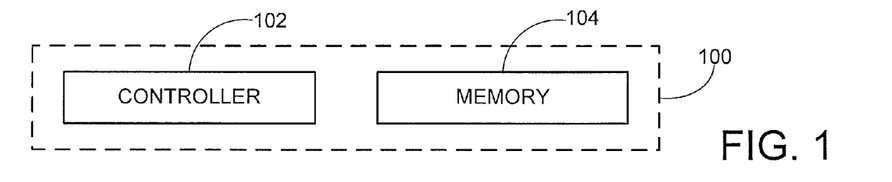
FIG. 1 provides a functional block representation of a data storage device in accordance with various embodiments.

These and other features of various embodiments can be understood beginning with a review of FIG. 1 which provides a simplified block diagram of a data storage device 100. The data storage device 100 includes two main modules: a controller 102 and a solid-state memory module 104. The controller 102 may be a hardware-based or programmable processor with associated memory. The memory module 104 may take a variety of forms and generally constitutes a solid-state non-volatile memory with associated control electronics.

For purposes of providing a concrete example, the device 100 will be contemplated as comprising a solid state drive (SSD) and the memory module 104 will comprise a flash memory device. Other configurations can be used, including configurations that incorporate the controller and memory module functions into a single integrated circuit as a system on chip, SOC.

Figure 2:
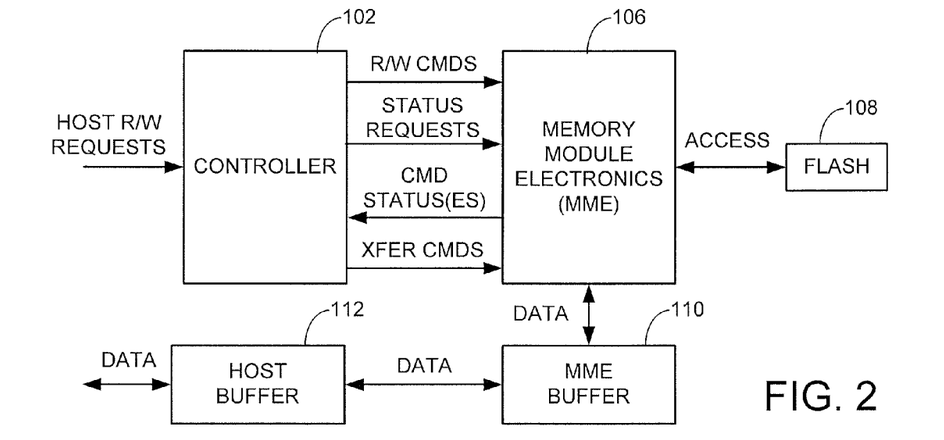
FIG. 2 shows aspects of the device of FIG. 1 in accordance with some embodiments.

FIG. 2 is a functional block representation of relevant portions of the storage device 100 of FIG. 1 in accordance with some embodiments. FIG. 2 shows the controller 102 in communication with memory module electronics (MME) 106. The MME 106 includes read/write/erase (R/W/E) circuitry and other control circuitry incorporated into the flash memory module 104 to write data to flash memory 108. The MME 106 can have a relatively small, local MME data buffer 110. A relatively large host buffer 112 associated with the controller 102 can buffer data pending transfers with a host device.

While not limiting, it will be recognized by those skilled in the art that current generation SSDs and other data storage device systems can be formed from integrated memory modules such as 104 that are commercially available from a source of such devices. The memory modules are integrated into an SSD by a device manufacturer which supplies the controller functions such as 102 and tailors the controller to operate with the memory module. The controller and memory module are thus separate operational entities which communicate across one or more defined data and command interfaces. A "pull" system is commonly used in which the controller 102 issues commands and then repetitively checks the status of those commands by the memory module 104 to determine whether the commands have been completed.

For example, when reading data from the memory 104, the controller 102 can issue a read command with a format that identifies the requested data to be returned from the memory to the controller, for subsequent transfer to an external host device coupled to the SSD 100. The MME 106 schedules and executes the read command and places the retrieved data into the local MME buffer 110. The controller 102 subsequently issues one or more status requests, such as read status enhanced (RSE) commands, which request a status associated with the retrieved data. The MME 106 supplies a read status in response to each status request.

If the MME 106 has not yet completed the data read operation, the MME may signal a "command still pending" read status. Once the data read operation is completed, the MME signals a "ready to transfer" read status, which indicates the retrieved data are pending in the MME buffer 110 and ready for transfer to the host buffer 112. The controller 102 subsequently issues a transfer (XFER) command to transfer the data from the MME buffer 110 to the host buffer 112, after which the data are transferred to the requesting host device.

Write (program) operations may be carried out in a similar fashion. The controller 102 issues a write command to the MME 106, and transfers the write data to the host buffer 112 pending transfer to the MME buffer 110 for subsequent processing and writing to the flash memory 108.

Figure 3A:
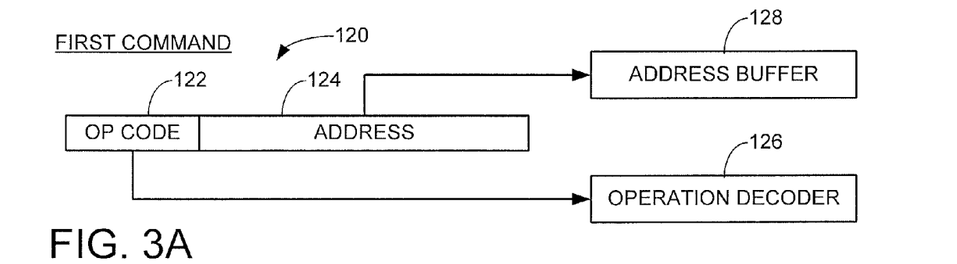
FIGS. 3A-3B provide an illustrative format for commands issued by the controller to the memory module electronics (MME) of FIG. 2.
Figure 3B:
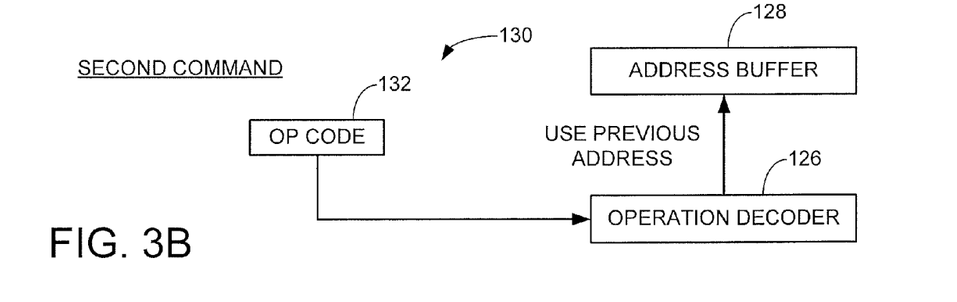

The various commands issued by the controller 102 to the MME 106 can take a general form as set forth by FIGS. 3A-3B. A first command 120 is depicted in FIG. 3A. The particular format of the first command 120 will depend on the communication protocols established to govern I/O communications between the controller and the MME.

Irrespective of the protocol, the first command will at least include two primary components: an operation (op) code 122 and an address 124. The op code 122 is a multi-bit sequence that is decoded by an operation decoder 126 of the MME 106 to signify the desired operation, or action, to be taken by the MME. A first multi-bit sequence may signify a read command, a second multi-bit sequence may signify a program command, and so on. The address 124 represents a corresponding memory location upon which the command is to be executed.

The address 124 of the first command 120 is loaded to an address buffer 128 of the MME 106. The address can take a variety of forms and may include values identifying a particular die, plane, garbage collection unit (GCU), erasure block, page, row, column offset, etc. Both row and/or column addressing can be used. Other elements may be incorporated into the command format as desired, such as headers, parity bits, etc. but such are omitted for simplicity of illustration.

FIG. 3B shows a second command 130 that is issued by the controller 102 to the MME 106 after the first command 120. The second command 130 includes an op code 132 that may the same as, or different from, the op code 122 of the first command 120. The op code 132 is decoded by the operation decoder to signify the desired operation to be taken by the MME. No address information is conveyed by the second command 130 in FIG. 3B. Instead, the decoder 126 decodes the second command, accesses the address buffer 128 to identify the existing address information, and carries out the desired operation using the existing address information in the address buffer. In this way, the second command "inherits" the address information from the first command. Any number of subsequent commands can inherit previously supplied address information.

Figure 4:
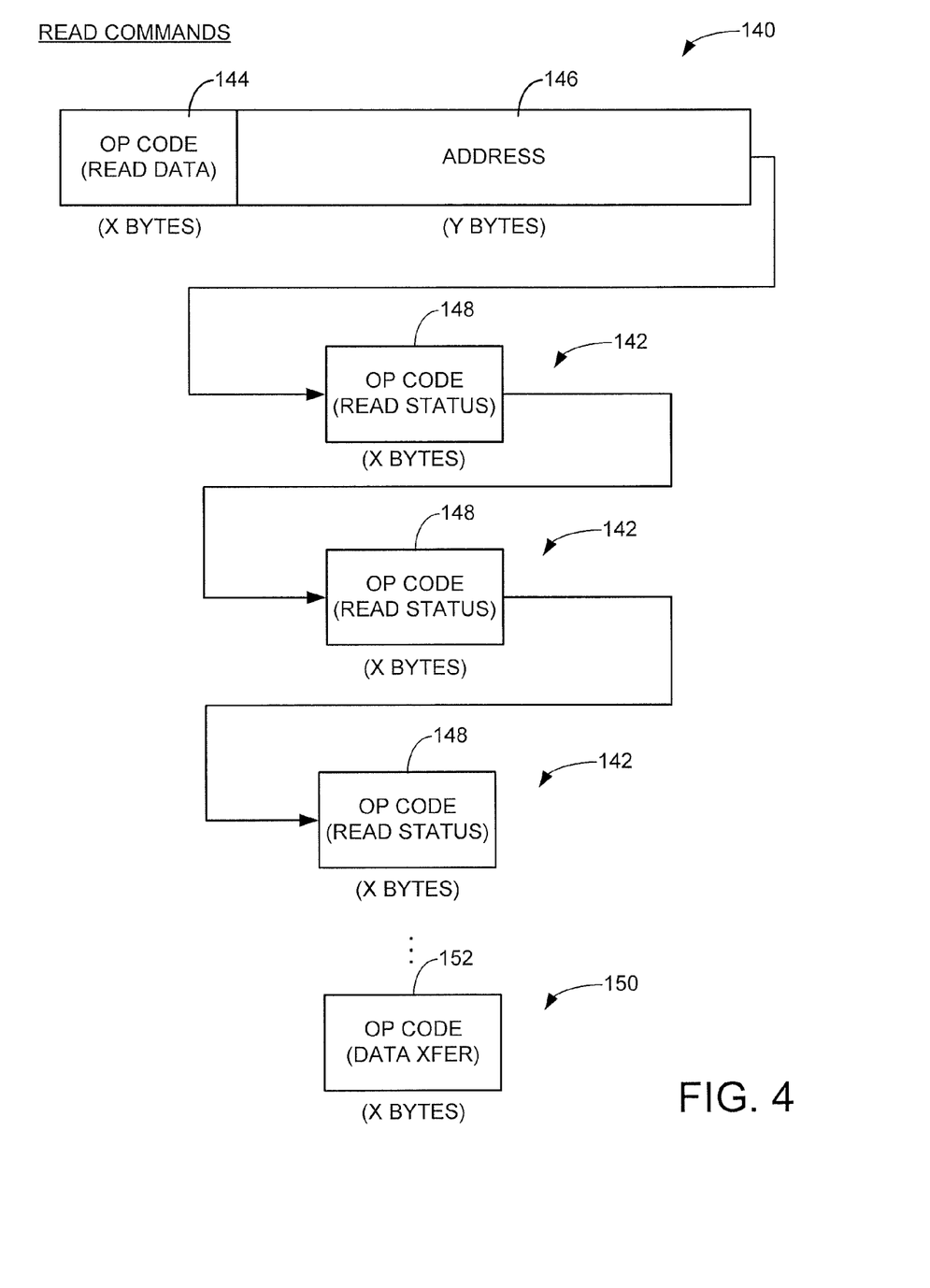
FIG. 4 is an illustrative format for a read command and subsequent status requests that use the address information from the read command.

A variety of command types are contemplated. FIG. 4 shows a first embodiment in which a read command 140 is issued by the controller 102, followed by a succession of status requests (read status enable, or RSE commands) 142 to request a status of the issued read command 140. The read command 140 includes an op code 144 with a multi-bit sequence indicating a read operation is being requested. This op code may be of a standard length, such as X bytes (e.g., 2 bytes, 4 bytes, etc.).

The read command 140 further includes address information 146, which may be of a standard length such as Y bytes (e.g., 4 bytes, 16 bytes, etc.). The addressing is of sufficient length to identify various physical address levels of the flash memory 108 such as plane, GCU, block, row/page, etc. Column offsets may be incorporated into the addressing portion of the command 140. As discussed in FIG. 3A, the op code 144 is decoded by the operation decoder 126 and the address 146 is loaded into the address buffer 128.

The controller 102 issues a succession of the read status requests 142, each comprising a single op code 148 and no associated address information. One or both of the op codes 144, 148 may be configured to signify the inherited addressing of the address information 146. As the MME 106 decodes each of the op codes 148, the MME 106 utilizes the address information in the address buffer 128 to determine which read command is being referenced.

Although not separately shown in FIG. 4, it will be appreciated that the MME 106 will return a status to the controller 102 in response to each status request 142. The controller 102 will continue to issue the status requests 142 on a regular basis until such time that the read operation indicated by the op code 144 has been completed and the requested data at the address 146 are transferred to the local MME buffer 110 (see FIG. 2).

As desired, the controller can issue a third type of command, such as a data transfer command 150 with op code 152, to initiate transfer of the data from the local MME buffer 110 to the host buffer 112. The data transfer command 150 does not include an address component and instead uses the address information from the first command 140.

Figure 5:
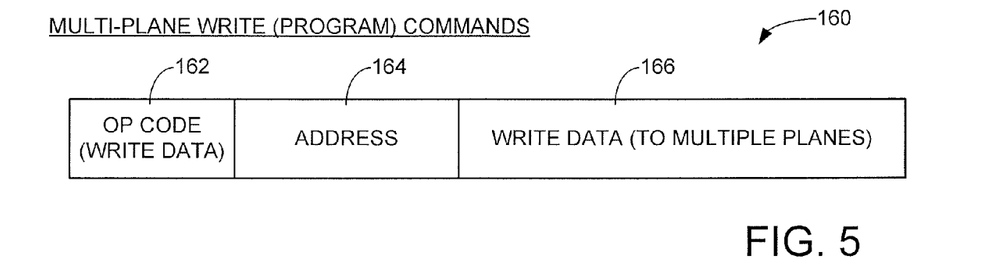
FIG. 5 is an illustrative format for a multi-plane write (program) command in which data are written to multiple planes of the memory of FIG. 2.

A second embodiment is shown in FIG. 5 for a multi-plane write (program) command 160. The multi-plane write command 160 generally operates to instruct the MME 106 to concurrently write data to multiple locations within the memory 108. The write command 160 includes an op code 162 ("write data"), address information 164 and a set of write data 166 to be written to the locations specified by the address information 164. The op code 162 is decoded by the decoder 126 and the address information is loaded to the address buffer 128 (see FIG. 3A).

Figure 6:
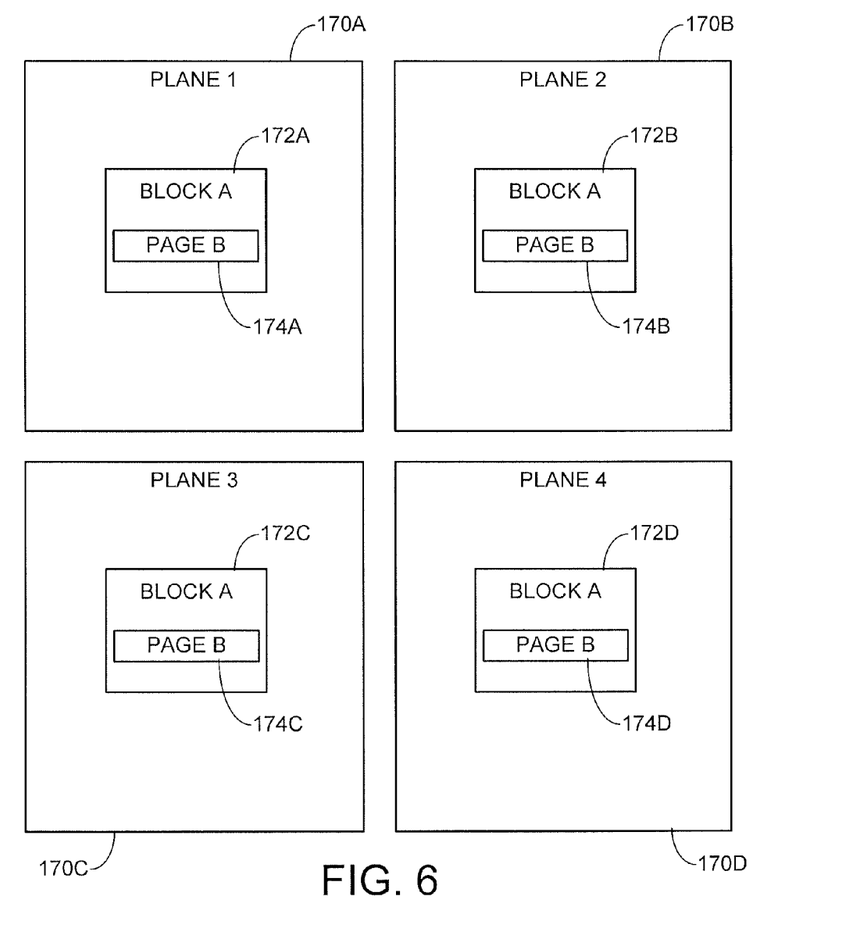
FIG. 6 represents four different planes to which data are written using the command from FIG. 5.

FIG. 6 shows a portion of the flash memory 108 to include four planes 170A-170D. Each plane has its own associated read/write/erasure (R/W/E) circuitry (not shown) so that data access operations can be concurrently carried out to each plane. Each plane is subdivided into smaller addressing components, such as erasure blocks 172A-172D which are denoted as Block A. Each erasure block represents a smallest set of flash memory cells that can be erased at a time.

Each erasure block is formed from a selected number N rows of flash memory cells, such as N=128. Each row has a selected number of flash memory cells, such as 65,536 cells to accommodate the storage of 8,192 bytes (8 KB) of data.

The cells may be arranged as single level cells (SLCs) or multi-level cells (MLCs). SLCs store a single bit and MLCs store multiple bits, such as two bits or more. In some embodiments, the cells are configured as MLCs so that each physical row of memory cells store two pages of data, with each page constituting 8 KB of data. A selected page 174A-174D is depicted in each of the blocks 172A-172D as shown.

The respective cells thus take four programming states (e.g., 11, 01, 00, 10) corresponding to different levels of accumulated charge within the cells. The least significant bits (LSBs) can denote the bit values for a first page of data and the most significant bits (MSBs) can denote the bit values for a second page of data.

Referring again to FIG. 5, the address information 164 specifies each of the planes 1-4, and specifies common block addressing (e.g., Block A) and page addressing (e.g., Page B) within the planes. In this case, the write data 166 in FIG. 5 can comprise 32 KB of data, with the first 8 KB written to Page B, Block A in Plane 1, the second 8 KB written to Page B, Block A in Plane 2, the third 8 KB written to Page B, Block A in Plane 3, and the fourth 8 KB written to Page B, Block A in Plane 4. These multiple program operations are carried out at the same time using the common address information 164. This eliminates the need to re-specify the address and supply the 8 KB data sets separately in four different write commands. Subsequent status commands, write complete requests, etc. can further be issued that use the previously loaded address information.

Figure 7:
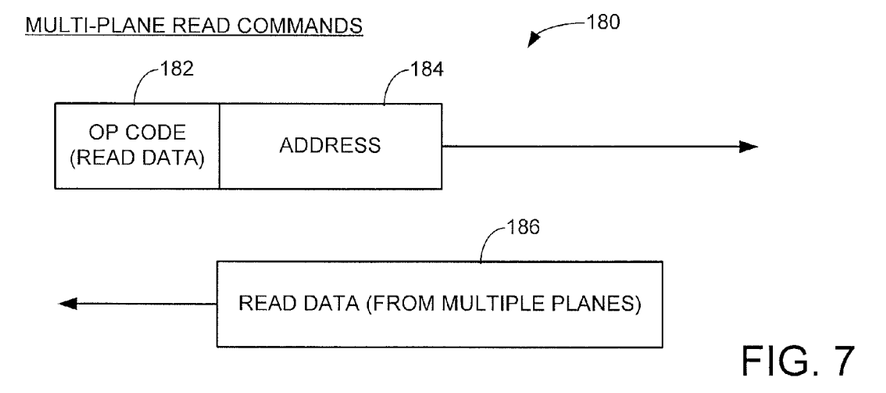
FIG. 7 is an illustrative format for a multi-plane read command in which data are read from the multiple planes of FIG. 6.

FIG. 7 depicts an example multi-plane read command 180 that may be subsequently issued by the controller 102 to read the data programmed by the command 160 in FIG. 5. As before, the multi-plane read command 180 includes an op code 182 (signifying a multi-plane read operation) and address information 184. The address information 184 may be identical to the format used in FIG. 5, or may take a different form.

The address information 184 identifies the target locations among the respective planes 1-4 in FIG. 6 from which data are to be read. The recovered data are represented by block 186, and constitutes the entire 32 KB read from the respective locations. A single read command can be issued and data recovered from multiple locations using the common address information supplied in the command. Subsequent commands, such as status commands, read transfer commands, etc. can be provided and serviced using the previously loaded address information as discussed above.

Figure 8:
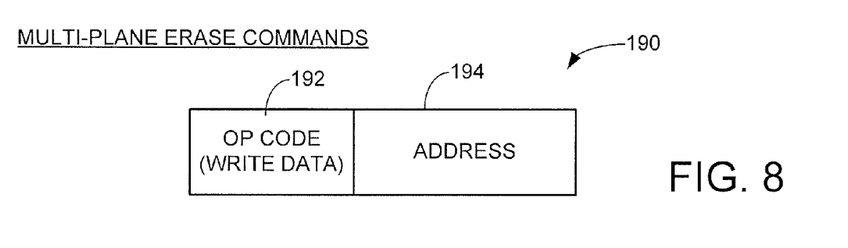
FIG. 8 is an illustrative format for a multi-plane erase command in which erasure blocks are erased in the multiple planes of FIG. 6.

FIG. 8 provides an example multi-plane erase command 190. The multi-plane erase command 190 commands an erasure of at least one erasure block (such as the blocks 172A-172D in FIG. 6) in multiple planes (such as the planes 170A-170D in FIG. 6). The erase command 190 includes an erase op code 192 and address information 194.

While the foregoing embodiments have contemplated row (and column) addressing, such is merely exemplary and not limiting. Other forms of addressing can be used, such as code words of fixed size per page. For example, a scheme may be enacted whereby M code words, such as M=8 or M=16, are arranged along each page. For a page size of 8192 bytes, eight (8) code words of 1024 bytes could be arranged along each page. As desired, the code words can comprise user data with separate parity (ECC) data stored elsewhere to detect and correct bit errors during read operations, or the code words can include both user data payload and ECC data. The addressing can thus include code word addressing bits to identify selected code words in different pages.

Figure 9A:
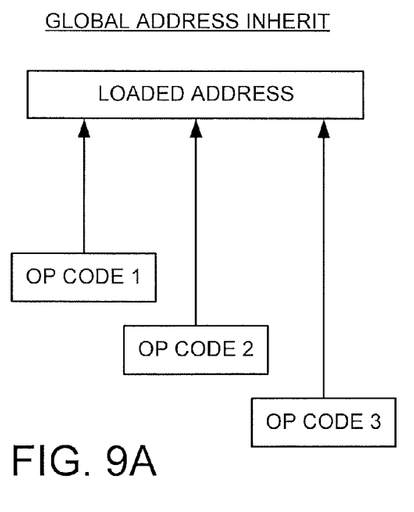
FIGS. 9A-9B represent a global address inherit mode and a local address inherit mode that can be utilized by commands such as in FIGS. 4-5 and 7-8.

The initiation of address inheriting and the subsequent disabling of address inheriting can be carried out in a variety of ways. In some cases, once an address is loaded into the address buffer (128, FIG. 3A), all subsequently received commands will be understood to refer to that loaded address until a new address is loaded or a specially configured command is issued to instruct the MME 106 to discontinue further use of address inheriting operations. FIG. 9A represents a global address inherit mode in which a loaded address continues to be used by multiple op codes (e.g., op codes 1-3). Each subsequently received op code continues to refer to the loaded address until the loaded address is cleared (such as by being overwritten with a new command with new address information, by receiving a command to clear the address buffer, etc.).

Figure 9B:
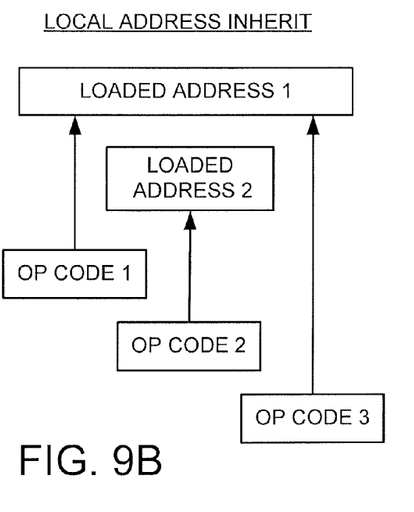

FIG. 9B illustrates a local address inherit mode where multiple addresses are loaded (e.g., address 1 and address 2). Each of these may be placed in separate address buffers, or a single buffer may be arranged to store different addresses. As can be seen from FIG. 9B, different op codes are arranged to refer to different loaded addresses. First and third op codes (e.g., op codes 1 and 3) use the first address (loaded address 1) and a second op code (op code 2) uses the second address (loaded address 2). Any respective numbers of op codes and addresses can be concurrently used.

In some cases, the respective address correspondence will be clear based on context. For example, if a single read command is pending, any read status requests received by the MME 106 will be associated with the address of the pending read command. In other cases, markers, flags, headers or other indication values can be used to ensure that particular op codes are intended to utilize particular addresses.

It will be appreciated that the address inherit features disclosed herein can be used with any number and types of commands, including read status enhanced (RSE) commands to provide optimized status checking of pending commands, data out commands that optimize the data transfer from the local buffer 110 to the host buffer 112, multi-plane commands, program, write and erase commands, data transfer commands, etc. Both global and local inherit modes can be used as desired.

In further embodiments, offsets can be applied to a loaded address for a given op code. A read command, for example, can be issued with an initial op code and an associated address. Subsequent commands can be issued that cause an increment or a decrement of the loaded address. For example, specially configured read commands can be issued that signify to increment the address by one "count" (e.g., the next row, the next code word, etc.). It will be appreciated that these alternative operations still involve the issuance of commands without a corresponding address component and inherit the existing address, as described above. As before, the same type of command can be issued, or different types of commands can be issued. The loaded address can be incremented and/or decremented by some selected amount.

Figure 10:
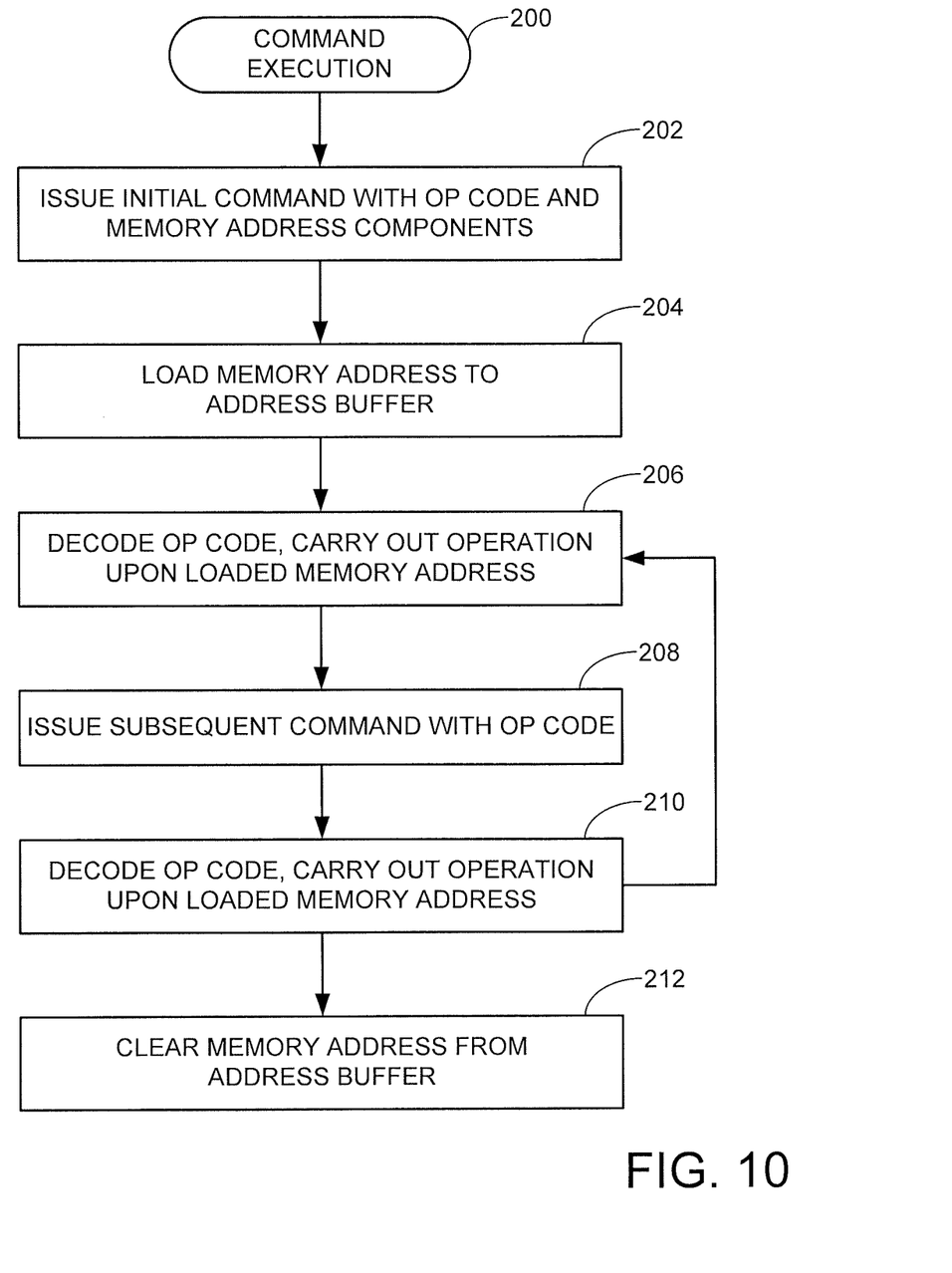
FIG. 10 is a COMMAND EXECUTION routine illustrative of steps carried out in accordance with some embodiments of the present disclosure.

FIG. 10 provides a flow chart for a COMMAND EXECUTION routine 200 to illustrate the foregoing discussion. It will be contemplated that the routine 200 describes the operation of a system such as configured in FIG. 2, although this is merely exemplary and not limiting. The various steps in FIG. 10 can be altered, performed in a different order, omitted, and other steps can be added as desired depending on the requirements of a given application.

A first command is issued by the controller 102 to the MME 106 at step 202. The first command can take any number of forms. For purposes of illustration, it will be contemplated that the first command is a read command, as discussed above in FIG. 4. The first command includes an op code component and a memory address component. The op code indicates a read operation is to be carried out to retrieve the data stored at the associated memory address specified by the command.

The memory address is loaded to an address buffer at step 204, as represented by 128 in FIG. 3A. The op code component of the first command is decoded at step 206, as represented by 126 in FIG. 3A, and the MME 106 proceeds to carry out the action identified by the decoded op code, which in this case involves the reading out of a copy of the data stored at the memory location.

The reading out of the data can be carried out in a variety of ways, such as by the application of appropriate voltages to various control lines connected to the associated memory cells and the sensing of different voltage or other readback levels provided by the cells. Other signal processing techniques may be applied as well, such as the application of decryption, error correction, deserialization/de-interleaving, etc.

A second command is subsequently issued by the controller 102 to the MME 106 at step 208. This second command includes a second op code and will generally not include any address information.

The second op code is decoded at step 210 and the MME 106 proceeds to carry out the associated action using the address information loaded at step 204. For example, the second op code may be a status request as discussed above in FIG. 4, in which case the MME 106 issues a status of the command. In another example, the MME 106 may have completed the decoding of the requested data and the data are pending in the local buffer 110 pending transfer, in which case the MME 106 may issue a data ready command.

The routine continues as shown to service additional commands that utilize the previously loaded address information until the memory address is cleared from the address buffer, as indicated at step 212. As noted above, this may occur as a result of a new command with new address information, or may be carried out in some other way.

While various embodiments have been described in the environment of a flash memory, such is merely illustrative. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising a memory module having a plurality of solid-state non-volatile memory cells and read/write/erase circuitry, and a controller circuit configured to communicate a command to the memory module comprising an operation code without a corresponding address value, the read/write/erase circuitry executing the operation code using an address value associated with a previously received command from the controller circuit.

2. The apparatus of claim 1, wherein the operation code directs the memory module to retrieve selected data from a selected group of the solid-state non-volatile memory cells, and the read/write/erase circuitry reads the selected data from the selected group of the solid-state non-volatile memory cells responsive to the operation code and the address value and places the selected data in a buffer memory.

3. The apparatus of claim 2, wherein the address value associated with the previously received command is a first address, and the selected group of the solid-state non-volatile memory cells is at a second address determined by applying an increment to the first address.

4. The apparatus of claim 1, wherein the operation code requests a status of the previously received command.

5. The apparatus of claim 1, wherein the operation code directs the memory module to write selected data to a selected group of the solid-state non-volatile memory cells, wherein the controller circuit places the selected data in a buffer, and wherein the read/write/erase circuitry transfers the selected data from the buffer to the selected group of the solid-state non-volatile memory cells responsive to the operation code and the address value.

6. The apparatus of claim 5, wherein the address value associated with the previously received command is a first address, and the selected group of the solid-state non-volatile memory cells is at a second address determined by applying an increment to the first address.

7. The apparatus of claim 1, wherein the address value comprises multiple planes of flash memory cells within the memory module and common block and page addresses within said multiple planes.

8. The apparatus of claim 1, wherein the address value identifies a specified memory location in the memory module, and wherein the command and the previously received command are both performed on the specified memory location.

9. The apparatus of claim 1, wherein the memory module comprises an address buffer and a decoder module, wherein the address value from the previously received command loaded to the address buffer, and wherein the decoder module decodes the operation code and accesses the address value in the address buffer to execute the operation code in relation to the address information in the address buffer.

10. The apparatus of claim 1, wherein the previously received command is characterized as a first command, the command comprising the operation code without the corresponding address value is characterized as a second command, and the controller issues a third command after the first command and prior to the second command, wherein the third command comprises an operation code that directs the memory module to take an action in relation to address information unrelated to the address information associated with the first command.

11. An apparatus comprising:
  a controller circuit; and
  a memory module comprising flash memory cells arranged into multiple planes, an address buffer, a decoder module, a read/write/erase circuit and a local buffer, the memory module configured to, responsive to receipt of a multi-plane access command from the controller circuit comprising an operation code and an address value identifying a common address location within each of the multiple planes, load the address information into the address buffer, decode the operation code using the decoder module to identify a selected data access operation, and concurrently execute the selected data access operation to the common address location within each of the multiple planes using the read/write erase circuit.

12. The apparatus of claim 11, wherein the selected data access operation is a read operation and the read/write/erase circuit transfers data stored at each of the common address location within each of the multiple planes as a contiguous block from the local buffer to a host buffer associated with the controller.

13. The apparatus of claim 11, wherein the selected data access operation is a write operation, wherein the common address location is a selected page address in each of the multiple planes, the multi-plane access command further comprises a set of write data, and a corresponding portion of the write data is concurrently written to the selected page address within each of the multiple planes using the read/write erase circuit.

14. The apparatus of claim 11, wherein the selected data access operation is an erasure operation, the common address location is a selected erasure block in each of the multiple planes, and the read/write/erase circuit concurrently erases the selected erasure block in each of the multiple planes.

15. The apparatus of claim 11, characterized as a solid-state drive (SSD).

16. A method comprising:
providing a memory module having a non-volatile memory array;
receiving a first command comprising an address value and a first operation code;
executing the first operation code to access data at an address in the memory array associated with the address value;
receiving a second command comprising a second operation code without a corresponding address value;
executing the second operation code using the address value of the first command.

17. The method of claim 16, wherein the memory module is a flash memory array of a solid-state drive (SSD), the SSD further comprising a controller circuit coupled to the flash memory array and configured to transmit the respective first and second commands thereto.

18. The method of claim 16, wherein the first command is a read command and the first action comprises reading data from the address of the memory module identified by the address value of the first command.

19. The method of claim 18, wherein the second command is a read status command and the execution of the second operation code produces an indication that the reading of the data from the address of the memory module identified by the address value of the first command is not yet completed.

20. The method of claim 16, wherein the address of the memory module identified by the address value is a first memory location within the memory module, and the execution of the second operation code is performed upon a second memory location identified by incrementing or decrementing the address of the first memory location by a selected interval value.

* * * * *